US009356351B2

(12) United States Patent
Sugita et al.

(10) Patent No.: US 9,356,351 B2
(45) Date of Patent: May 31, 2016

(54) ANTENNA APPARATUS, COMMUNICATION APPARATUS, AND ANTENNA APPARATUS MANUFACTURING METHOD

(71) Applicant: Dexerials Corporation, Tokyo (JP)

(72) Inventors: Satoru Sugita, Tochigi (JP); Yoshito Ikeda, Tochigi (JP); Norio Saito, Tochigi (JP)

(73) Assignee: Dexerials Corporation, Tokyo (JP)

( * ) Notice: Subject to any disclaimer, the term of this patent is extended or adjusted under 35 U.S.C. 154(b) by 113 days.

(21) Appl. No.: 14/361,341

(22) PCT Filed: Nov. 26, 2012

(86) PCT No.: PCT/JP2012/080472
§ 371 (c)(1),
(2) Date: May 29, 2014

(87) PCT Pub. No.: WO2013/080916
PCT Pub. Date: Jun. 6, 2013

(65) Prior Publication Data
US 2014/0320354 A1 Oct. 30, 2014

(30) Foreign Application Priority Data

Nov. 29, 2011 (JP) .................................. 2011-260639

(51) Int. Cl.
*H01Q 1/24* (2006.01)
*H01Q 7/06* (2006.01)
(Continued)

(52) U.S. Cl.
CPC ............ *H01Q 7/06* (2013.01); *G06K 19/07749* (2013.01); *G06K 19/07771* (2013.01); *H01Q 1/2225* (2013.01); *H01Q 1/24* (2013.01);
(Continued)

(58) Field of Classification Search
CPC ....... H01Q 7/06; H01Q 1/2225; H01Q 1/243; G06K 19/077; G06K 19/07749; G06K 19/07771
USPC .......................................... 343/788, 787, 702
See application file for complete search history.

(56) References Cited

U.S. PATENT DOCUMENTS 8,849,195 B2 * 9/2014 Orihara .................. H01Q 1/243
343/787

FOREIGN PATENT DOCUMENTS

| JP | 2005-210223 A | 8/2005 |
| JP | 2007-013662 A | 1/2007 |

(Continued)

OTHER PUBLICATIONS

International Search Report issued in PCT/JP2012/080472 mailed on Feb. 26, 2013 (4 pages).

*Primary Examiner* — Hoang V Nguyen
(74) *Attorney, Agent, or Firm* — Osha Liang LLP

(57) ABSTRACT

An antenna apparatus, which is assembled into an electronic apparatus and made communicatable upon receipt of a magnetic field transmitted from a transmitter, includes a laminated member made by mutually superimposing an antenna coil inductively coupled to the transmitter and formed on an antenna substrate with a magnetic sheet for drawing a magnetic field transmitted from the transmitter to the antenna coil, a film-shaped protective member that covers the laminated member at least up to an end portion of the magnetic sheet, and a communication processing unit that carries out communication to and from the transmitter and is driven by an electric current flowing through the antenna coil.

2 Claims, 6 Drawing Sheets

(51) Int. Cl.
*H01Q 1/22* (2006.01)
*H01Q 7/00* (2006.01)
*G06K 19/077* (2006.01)

(52) U.S. Cl.
CPC ................ *H01Q1/243* (2013.01); *H01Q 7/00* (2013.01); *Y10T 29/49018* (2015.01)

(56) References Cited

FOREIGN PATENT DOCUMENTS

| | | |
|---|---|---|
| JP | 2008-035464 A | 2/2008 |
| JP | 2008-040904 A | 2/2008 |
| JP | 2011-119819 A | 6/2011 |
| WO | 2011/125850 A1 | 10/2011 |

\* cited by examiner

ANTENNA APPARATUS, COMMUNICATION APPARATUS, AND ANTENNA APPARATUS MANUFACTURING METHOD

CROSS-REFERENCE TO RELATED APPLICATIONS

This application is a National Stage application of International Patent Application No. PCT/JP2012/080472, filed on Nov. 26, 2012, and claims priority pursuant to 35 U.S.C. §119(a) to Japanese Patent Application No. 2011-260639, filed on Nov. 29, 2011. The international application and priority application are hereby incorporated by reference in their entirety.

BACKGROUND OF INVENTION

1. Field of the Invention

One or more embodiments of the present invention relate to an antenna apparatus that is assembled into an electronic apparatus and made communicatable upon receipt of a magnetic field transmitted from a transmitter, and a communication apparatus, as well as a method for manufacturing such an antenna apparatus.

2. Background Art

In electronic apparatuses such as portable telephones or the like, an antenna module for an RFID (Radio Frequency Identification) has been used for installing a function for near non-contact communication therein.

This antenna module carries out a communication by utilizing an inductive coupling with an antenna coil mounted on a transmitter such as a reader writer or the like. That is, by allowing its antenna coil to receive a magnetic field from the reader writer, this antenna module converts it to electric power and makes it possible to drive an IC that functions as a communication processing unit.

In order to positively carry out communication, the antenna module needs to receive a magnetic flux of a predetermined value or more from the reader writer. For this reason, an antenna module in accordance with a conventional example installs a loop coil in a casing of the portable telephone, and receives the magnetic flux from the reader writer by using this coil.

However, in the antenna module assembled into an electronic apparatus such as a portable telephone or the like, because the magnetic flux from the reader writer is repelled by an eddy current that is generated by metals for use in substrates, battery packs and the like inside the apparatus, when they receive a magnetic field from the reader writer, the magnetic flux reaching the loop coil becomes smaller. As the magnetic flux reaching the loop coil becomes smaller in this manner, the antenna coil may require a loop coil having a certain degree of size for collecting required magnetic fluxes, and it may be necessary to use a magnetic sheet so as to increase the magnetic fluxes.

As described above, the magnetic flux from the reader writer is repelled by the eddy current flowing through the substrate of the electronic apparatus such as a portable telephone or the like; however, on the surface of the casing in the electronic apparatus, there is a magnetic field component directed in the in-plane direction of the substrate, and Patent Document 1 has proposed an apparatus in which, by receiving this component, a function for an antenna is exerted. More specifically, Patent Document 1 has proposed an antenna structure in which a coil is wounded around a ferrite core so as to reduce the occupied area of the coil.

RELATED ART

Patent Document

PTL 1: Japanese Patent Application Laid-Open No. 2008-35464

As described above, in an electronic apparatus such as a portable telephone or the like, because members, such as substrates or the like, that transmit electricity comparatively well are used, a magnetic field is repelled by an eddy current generated in the substrate that has received the magnetic field. For example, when considering the casing surface of the portable telephone, the magnetic field that is applied from the reader writer tends to become stronger on the outer peripheral portion of the casing surface, while it tends to become weaker in the vicinity of the center of the casing surface.

In the case of an antenna using a normal loop coil, the opening portion of the loop coil is positioned in the center portion of the portable telephone that is not allowed to receive the magnetic field passing through the above-mentioned outer peripheral portion of the casing surface so much. For this reason, in the case of an antenna using the normal loop coil, the efficiency for receiving a magnetic field becomes poor.

Moreover, in the case of an antenna structure in which a coil is wounded around a ferrite core described in Patent Document 1 and the coil is assembled into the portable telephone, because the cross section of the ferrite core corresponds to the area for use in collecting a magnetic flux, the thickness of the ferrite core of, for example, 1 mm or more is required, with the result that the casing of the portable telephone has a comparatively thick structure. Therefore, this structure is difficult to be installed inside a portable telephone having a comparatively thin size. Moreover, in the case when this antenna module is assembled on the rear side of a liquid crystal display installed on a folding portable telephone, because the thinness thereof is also required, the antenna structure disclosed in Patent Document 1 is difficult to ensure the required space.

Moreover, members formed by sintering a magnetic material such as ferrite or the like are used to efficiently draw a magnetic field applied from a reader writer into the antenna coil; however, they have such a characteristic that the end portion is easy to be chipped off when an external force, such as an impact, is applied thereto. Such chipped off powder-state material may cause adverse effects to other electronic devices assembled into, for example, a portable telephone.

SUMMARY OF INVENTION

Accordingly, one or more embodiments of the present invention provide an antenna apparatus which can maintain a communication characteristic by using a magnetic sheet for use in drawing a magnetic field into an antenna coil, achieve a small size of a casing of an electronic apparatus when assembled into the electronic apparatus, and exert a high strength against an external physical force. Moreover, one or more embodiments provide a method for manufacturing a communication apparatus in which such an antenna apparatus has been assembled, and such an antenna apparatus.

In addition, one or more embodiments of the present invention may comprise an antenna apparatus that is assembled into an electronic apparatus and made communicatable upon receipt of a magnetic field transmitted from a transmitter, and the antenna apparatus is provided with the laminated member made by mutually superimposing an antenna coil that is formed on an antenna substrate and inductively coupled to the transmitter and a magnetic sheet for drawing a magnetic field transmitted from the transmitter to the antenna coil with each other, and a protective member having a film shape that covers the laminated member at least up to the end portion of the magnetic sheet, and because the laminated member is inserted into the center portion of the antenna coil formed on the antenna substrate, the antenna coil and the magnetic sheet are mutually superimposed in a manner so as to satisfy both of an arrangement condition in which the magnetic sheet is positioned on the transmitter side rather than the antenna coil on the upstream side in the proceeding direction of the magnetic field oriented by the casing surface that is opposed to the transmitter and an arrangement condition in which the antenna coil is positioned on the transmitter side rather than the magnetic sheet on the downstream side in the oriented proceeding direction.

Moreover, one or more embodiments of the present invention may comprise a communication apparatus that is assembled into an electronic apparatus and made communicatable upon receipt of a magnetic field transmitted from a transmitter, and may be provided with the laminated member made by an antenna coil that is formed on an antenna substrate, and inductively coupled to the transmitter and a magnetic sheet for drawing a magnetic field transmitted from the transmitter to the antenna coil are mutually superimposed thereon, a protective member having a film shape that covers the laminated member at least up to the end portion of the magnetic sheet and a communication processing unit that is driven by an electric current flowing through the antenna coil, and carries out communication to and from the transmitter, and because the laminated member is inserted into the center portion of the antenna coil formed on the antenna substrate, the antenna coil and the magnetic sheet are mutually superimposed on each other in a manner so as to satisfy both of the arrangement condition in which the magnetic sheet is positioned on the transmitter side rather than the antenna coil on the upstream side in the proceeding direction of the magnetic field oriented by the casing surface that is opposed to the transmitter and the arrangement condition in which the antenna coil is positioned on the transmitter side rather than the magnetic sheet on the downstream side in the oriented proceeding direction.

Moreover, one or more embodiments of the present invention may include a manufacturing method for an antenna apparatus that is assembled into an electronic apparatus and made communicatable upon receipt of a magnetic field transmitted from a transmitter, and the manufacturing method may comprise mutually superimposing an antenna coil that is formed on an antenna substrate and inductively coupled to the transmitter and a magnetic sheet that draws a magnetic field transmitted from the transmitter into the antenna coil on each other, and covering the laminated member in which the magnetic sheet and the antenna coil are superimposed thereon by using a protective member having a film shape at least up to the end portion of the magnetic sheet, and in the superimposing, by inserting the magnetic sheet into the center portion of the antenna coil formed on the antenna substrate, the antenna coil and the magnetic sheet are mutually superimposed in a manner so as to satisfy both of the arrangement condition in which the magnetic sheet is positioned on the transmitter side rather than the antenna coil on the upstream side in the proceeding direction of the magnetic field oriented by the casing surface that is opposed to the transmitter and the arrangement condition in which the antenna coil is positioned on the transmitter side rather than the magnetic sheet on the downstream side in the oriented proceeding direction.

In accordance with one or more embodiments of the present invention, by using a magnetic sheet for drawing a magnetic field to an antenna coil, a communication characteristic is maintained, while achieving a small size of a casing of an electronic apparatus when assembled into the electronic apparatus, and by covering the laminated member in which the antenna coil and the magnetic sheet are mutually superimposed with the film-shaped protective member up to at least the end portion of the magnetic sheet; the apparatus according to one or more embodiments of the present invention is capable of exerting a high strength against a physical external force.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. Referring to Figures, the following description will discuss embodiments for carrying out one or more embodiments of the present invention in detail. Additionally, one or more embodiments of the present invention is not intended to be limited by the following embodiments, and it is needless to say that various modifications may be made therein without departing from the scope of one or more embodiments of the present invention.

Figure 1:
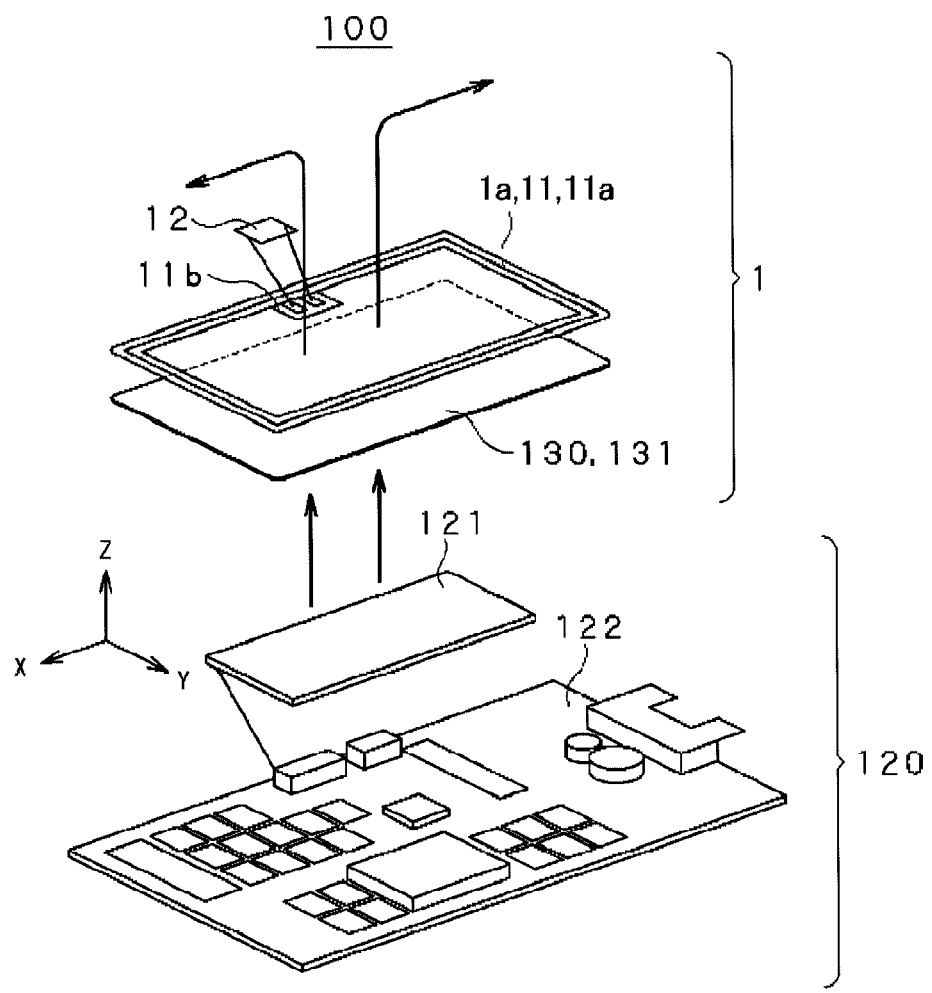
FIG. 1 is a drawing for use in explaining a configuration of a radio communication system in which a communication apparatus according to one or more embodiments of the present invention is assembled.

The communication apparatus according to one or more embodiments of the present invention may be an apparatus that is assembled into an electronic apparatus and made communicatable upon receipt of a magnetic field transmitted from a transmitter, and is incorporated into a radio communication system 100 for an RFID (Radio Frequency Identification), for example, as shown in FIG. 1, and used.

The radio communication system 100 according to one or more embodiments may comprise a communication apparatus 1 and a reader writer 120 that accesses the communication apparatus 1. In this case, the communication apparatus 1 and the reader writer 120 are supposed to be disposed so as to be made face to face with each other on the xy plane of a three-dimensional orthogonal coordinate system xyz.

The reader writer 120 functions as a transmitter for transmitting a magnetic field in the z-axis direction to the communication apparatus 1 that is mutually made face to face thereto on the xy plane, and is more specifically provided with an antenna 121 that transmits a magnetic field toward the communication apparatus 1 and a control substrate 122 that communicates with the communication apparatus 1 that is inductively coupled thereto through the antenna 121.

That is, the reader writer 120 is provided with the control substrate 122 that is electrically connected to the antenna 121. On the control substrate 122, a control circuit, which is made of electronic parts, such as one or a plurality of electronic integrated circuit chips or the like, is assembled. The control circuit executes various processes based upon data received from the communication apparatus 1. For example, upon transmitting data to the communication apparatus 1, the control circuit encodes data, and based upon the encoded data, modulates a carrier wave having a predetermined frequency (for example, 13.56 MHz), amplifies a modulation signal thus modulated, and drives the antenna 121 by using the amplified modulation signal. Moreover, upon reading data from the communication apparatus 1, the control circuit amplifies the modulation signal of data received by the antenna 121, demodulates the modulation signal of the amplified data, and decodes the data thus demodulated. Additionally, in the control circuit, an encoding system and a demodulation system generally used in a reader writer are adopted, and, for example, a Manchester encoding system and an ASK (Amplitude Shift Keying) modulation system are used.

The communication apparatus 1 is provided with an antenna module 1a having an antenna substrate 11 in which an antenna coil 11a, which is assembled into a casing 131 of a portable telephone 130, disposed so as to be made face to face with, for example, the reader writer 120 on the xy plane, and is made communicatable with the reader writer 120 inductively coupled thereto, is assembled, and a communication processing unit 12 that is driven by an electric current flowing through the antenna coil 11a, and communicates with the reader writer 120.

On the antenna substrate 11, the antenna coil 11a formed by patterning a flexible lead line, such as, for example, a flexible printed substrate or the like, and a terminal unit 11b that electrically connects the antenna coil 11a with the communication processing unit 12, are assembled.

Upon receipt of a magnetic field transmitted from the reader writer 120, the antenna coil 11a is magnetically coupled with the reader writer 120 via inductive coupling, and receives a modulated electromagnetic wave, and supplies the received signal to the communication processing unit 12 through the terminal unit 11b.

The communication processing unit 12 is driven by an electric current flowing through the antenna coil 11a, and communicates with the reader writer 120. More specifically, the communication processing unit 12 demodulates the modulation signal received, decodes the demodulated data, and writes the decoded data in the inner memory possessed by the communication processing unit 12. Moreover, the communication processing unit 12 reads out data to be transmitted to the reader writer 120 from the inner memory, and encodes the data thus read out, and then modulates a carrier wave based upon the encoded data, and transmits the modulated electric wave to the reader writer 120 through the antenna coil 11a magnetically coupled thereto via inductive coupling.

In the radio communication system 100 having the above-mentioned configuration, the following description will discuss the configuration of the antenna module 1a.

Figure 2A:
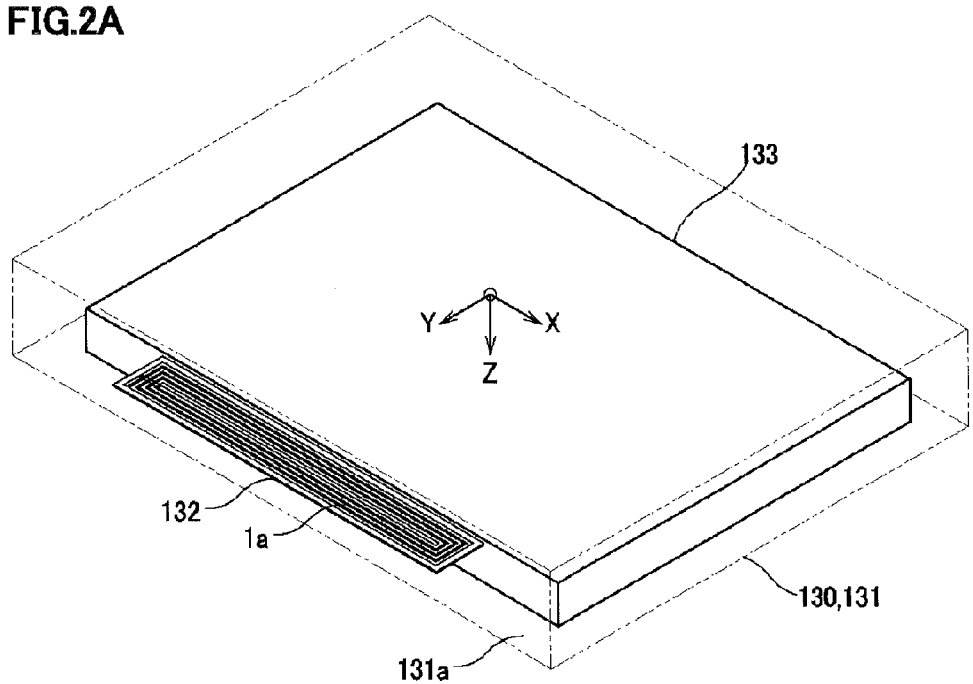
FIGS. 2A-2B depict drawings for use in explaining a configuration of the communication apparatus that is disposed inside a casing of a portable telephone according to one or more embodiments.

From the viewpoints of miniaturizing an electronic apparatus when assembled into the electronic apparatus such as a portable telephone 130 or the like, and of realizing a good communication characteristic to and from the reader writer 120, the antenna coil 11a of the antenna module 1a is disposed in a gap 132 between a battery pack 133 installed inside the casing 131 of the portable telephone 130 and an inner circumferential wall 131a of the casing 131, for example, on the xy plane of the three-dimensional orthogonal coordinate system xyz as shown in FIG. 2A.

Additionally, the antenna module 1a may be installed not only in the gap 132 between the battery pack 133 and the inner circumferential wall 131a of the casing 131, as described above, but also in a gap between a conductor disposed inside the casing 131, such as, for example, an integrated circuit substrate or the like and the inner circumferential wall of the casing. In the present embodiment, explanations will be made on the assumption that the antenna module 1a is disposed in a gap between the end portion 133b of the metal plate 133a that is made face to face with the reader writer 120 serving as the metal casing of the battery pack 133, as shown in FIG. 2B, and the inner circumferential wall 131a of the casing 131, as a plate-shaped conductor, for convenience of explanation.

Figure 2B:
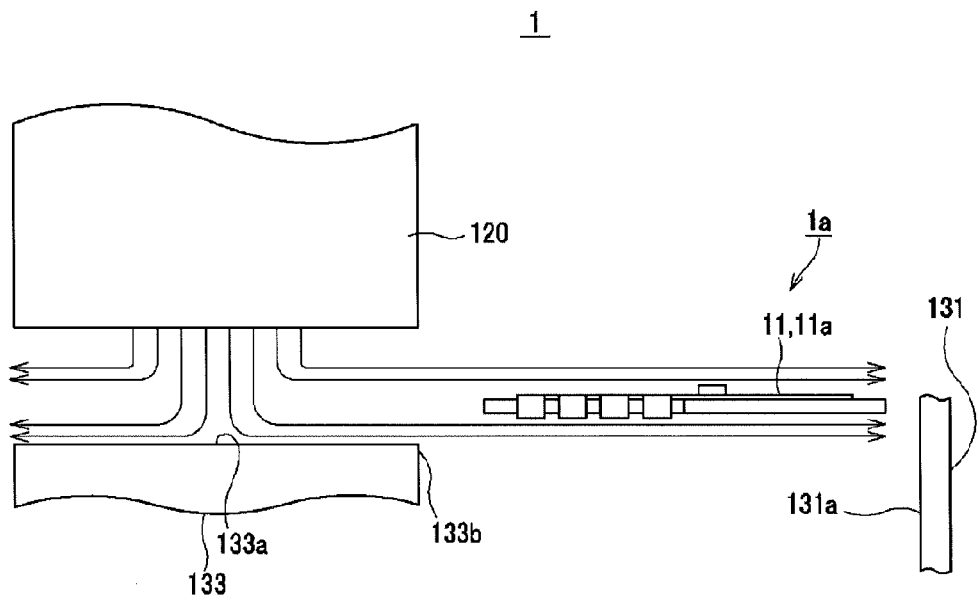

In this case, as shown in the cross-sectional view in FIG. 2B, because the metal plate 133a serving as the metal casing of the battery pack 133 disposed in the portable telephone 130 allows electricity to pass therethrough comparatively well, an eddy current is generated when an AC magnetic field is applied thereto from the outside, with the result that the magnetic field is repelled therefrom. By making an examination of the magnetic field distribution upon application of the AC magnetic field from the outside in this manner, a characteristic is found in which the magnetic field is strong at the end portion 133b of the metal plate 133a of the battery pack 133 that is made face to face with the reader writer 120. More specifically, the magnetic field in the gap 132 in which the antenna module 1a is disposed has a greater component in the y-axis direction. In order to effectively draw the magnetic field having a greater component in the y-axis direction into the antenna coil 11a, the antenna module 1a is provided with the magnetic sheet 13 that is disposed as shown in FIGS. 3A-3B, and superimposed on the antenna coil 11a.

Figure 3A:
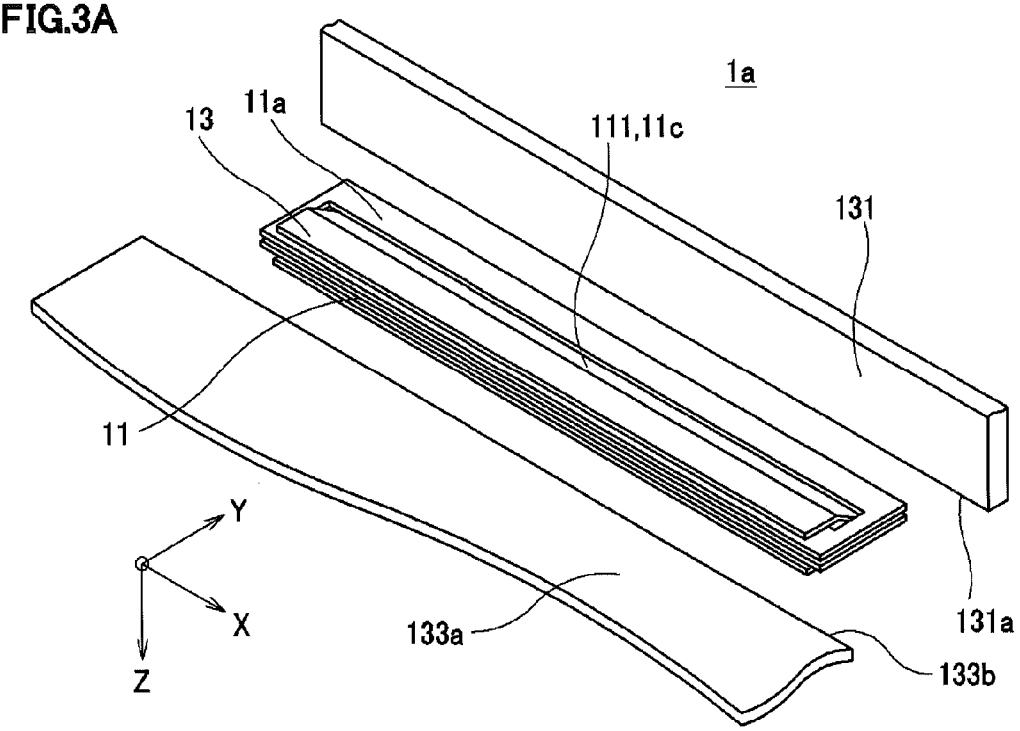
FIG. 3A is a perspective view showing an antenna module according to one or more embodiments.
Figure 3B:
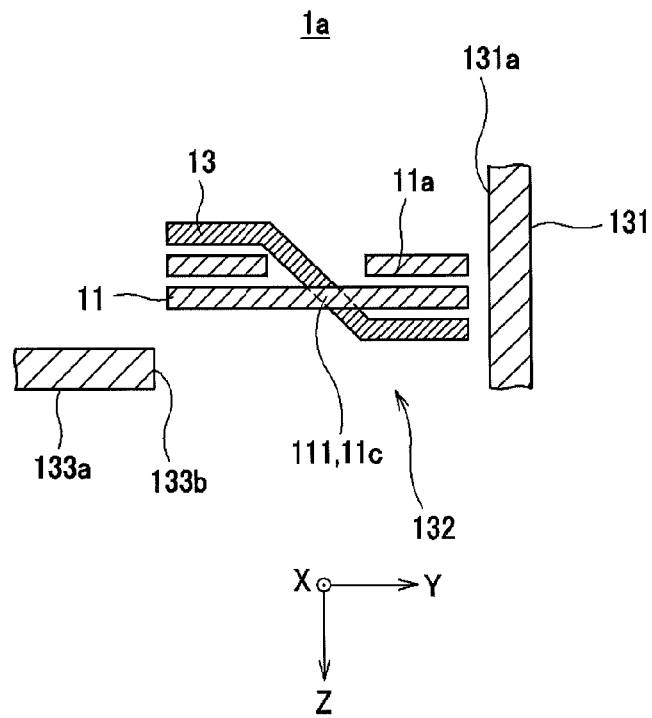
FIG. 3B is a cross-sectional view of the antenna module according to one or more embodiments.

Here, FIG. 3A is a perspective view of the antenna substrate 11 in which the magnetic sheet 13 is inserted on the xy plane, and FIG. 3B is a cross-sectional view of the antenna substrate 11 in which the magnetic sheet 13 is inserted on the xy plane.

As shown in FIG. 3B, in the antenna module 1a, the magnetic sheet 13 is inserted into the center portion 11c of the antenna coil 11a formed on the antenna substrate 11 in such a manner that on the upstream side in the proceeding direction of the magnetic field oriented by the metal plate 133a that is opposed to the reader writer 120, the magnetic sheet 13 is disposed so as to be positioned on the reader writer 120 side rather than the antenna coil 11a and on the downstream side in the proceeding direction of the oriented magnetic field, the antenna coil 11a is disposed so as to be positioned on the reader writer 120 side rather than the magnetic sheet 13.

In this case, the antenna substrate 11 is prepared as a flexible printed substrate, a rigid printed substrate, or the like, as described above, and in particular, by using the flexible printed substrate, a cut-out portion is easily formed in the center portion of the antenna coil 11a, and the magnetic sheet 13 is easily inserted into this cut-out portion. From the viewpoint of easily inserting the magnetic sheet 13 into the antenna substrate 11, the antenna module 1a may be formed into the antenna substrate 11 by using a flexible printed substrate. Moreover, by using the flexible printed substrate, the corresponding antenna module 1a can be easily produced.

In this manner, the antenna module 1a is designed such that by disposing the magnetic sheet 13 so as to be positioned on the reader writer 120 side rather than the antenna coil 11a on the upstream side in the proceeding direction of the magnetic field oriented by the metal plate 133a that is made face to face to the reader writer 120, while disposing the antenna coil 11a so as to be positioned on the reader writer 120 side rather than the magnetic sheet 13 on the downstream side in the proceeding direction of the magnetic field thus oriented, the magnetic field generated in the gap 132 can be effectively drawn into the antenna coil 11a.

Moreover, because the antenna module 1a has a structure in which the antenna coil 11a is wounded around so as to allow its opening portion, that is, the center portion 11c thereof, to be positioned in the gap 132, it becomes possible to miniaturize the casing 131 when assembled into an electronic apparatus, such as a portable telephone 130 or the like.

The reason that the magnetic field generated in the gap 132 is allowed to be effectively drawn in the antenna coil 11a is by disposing the magnetic sheet 13 as described above, a magnetic field component, which is directed from the end portion 133b of the metal plate 133a toward the inner circumferential wall 131a of the casing 131, is allowed to effectively pass through the opening portion of the antenna coil 11a.

Figure 4A:
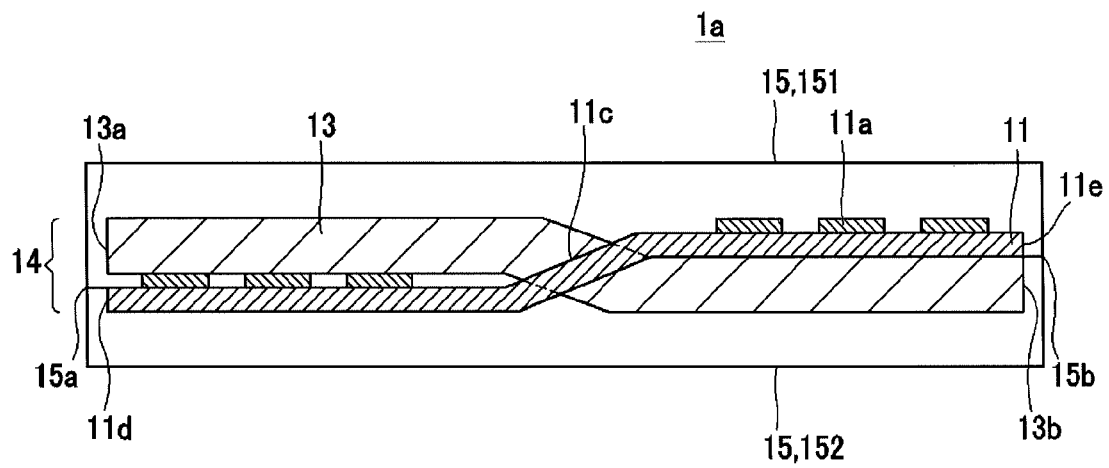
FIGS. 4A-4B depict drawings for use in explaining a configuration of the antenna module in which protective members are stacked on both of surfaces of the laminated member of the magnetic sheet and an antenna coil according to one or more embodiments.
Figure 4B:
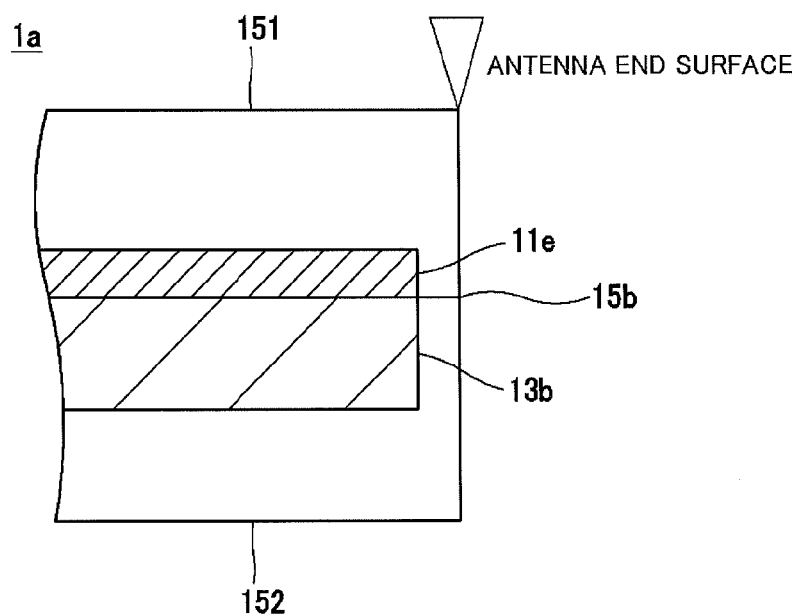

Moreover, in order to maintain strength against an external physical force, the antenna module 1a is designed so that, as shown in FIGS. 4A-4B, the laminated member 14 as a whole, in which the magnetic sheet 13 and the antenna coil 11a are superimposed on each other, is covered with a film-shaped protective member 15. In this case, the protective member 15 is composed of two sheets 151 and 152 that cover the upper and lower surfaces of the laminated member 14. These sheets 151 and 152, each having a width wider than each of both of the end portions 11d and 11e of the antenna 11, are bonded to each other by coupling portions 15a and 15b.

In this manner, the antenna module 1a has its end portions 13a and 13b of the magnetic sheet 13 covered with the film-shaped protective member 15; therefore, even in the case when, for example, an impact is applied to the antenna module 1a or when the magnetic sheet 13 is inserted into the antenna coil 11a, the sheet 13 is deformed to cause a crack therein, powder-state magnetic materials are prevented from being scattered outside of the module. That is, the antenna module 1a makes it possible to prevent powder-state separated materials from causing adverse effects to the other electronic devices assembled into the portable telephone 130.

Figure 5A:
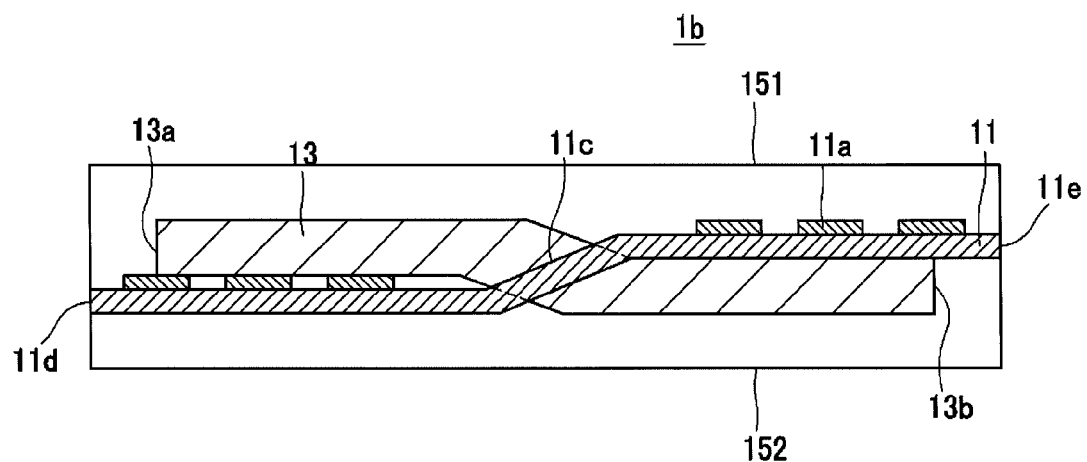
FIGS. 5A-5B depict drawings for use in explaining the antenna module in which protective members are stacked on both of surfaces of the laminated member of the magnetic sheet and an antenna coil according to one or more embodiments.
Figure 5B:
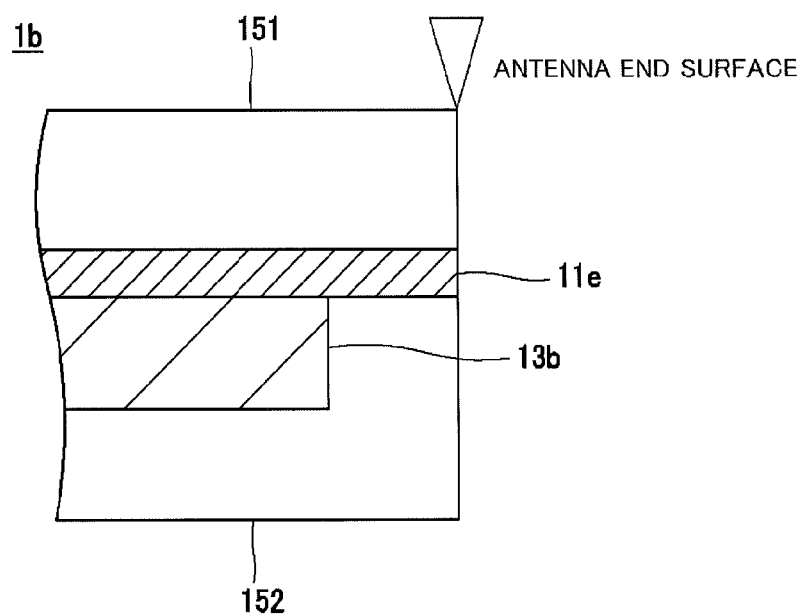

The antenna module 1a as shown in FIGS. 4A-4B has a structure in which, as shown in FIG. 4B, both of the end portions 11d and 11e of the antenna substrate 11, on which the antenna coil 11a is formed, are also covered with the protective member 15; however, as shown in an antenna module 1b relating to, for example, a modified example shown in FIGS. 5A-5B, when covered with the protective member 15 up to the end portions 13a and 13b of the magnetic sheet 13, the above-mentioned scattering of the magnetic materials can be prevented.

That is, in the antenna module 1b relating to the modified example, as shown in FIG. 5A, in the y-axis direction in which they are inserted into the center portion 11c of the antenna coil 11a, both of the end portions 13a and 13b of the magnetic sheet 13 are inserted into the antenna coil 11a, with those end portions being positioned in the center portion 11c rather than both of the end portions 11d and 11e of the antenna substrate 11 on which the antenna coil 11a is respectively formed. Moreover, as shown in FIG. 5B, the antenna module 1b allows the protective member 15 to cover the end portion 13b of the magnetic sheet 13; however, the end portion 11e of the antenna substrate 11 is not covered with the protective member 15, and by using this structure, the outside shape of the antenna coil 11a can be made as large as possible in the case when the dimension of the antenna module is limited, so that it becomes possible to realize a comparatively good communication characteristic. Furthermore, the antenna module 1b makes it possible to omit the spaces of the joining units 15a and 15b where the above-mentioned sheets 151 and 152 are mutually bonded, and consequently to achieve a reduced space.

Figure 6A:
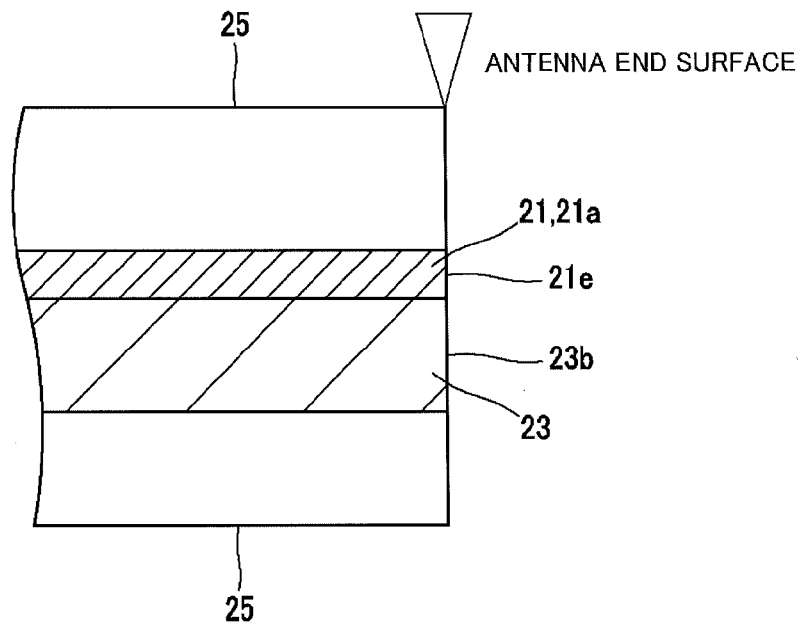
FIGS. 6A-6B depict drawings for use in explaining example of an antenna module according to one or more embodiments.
Figure 6B:
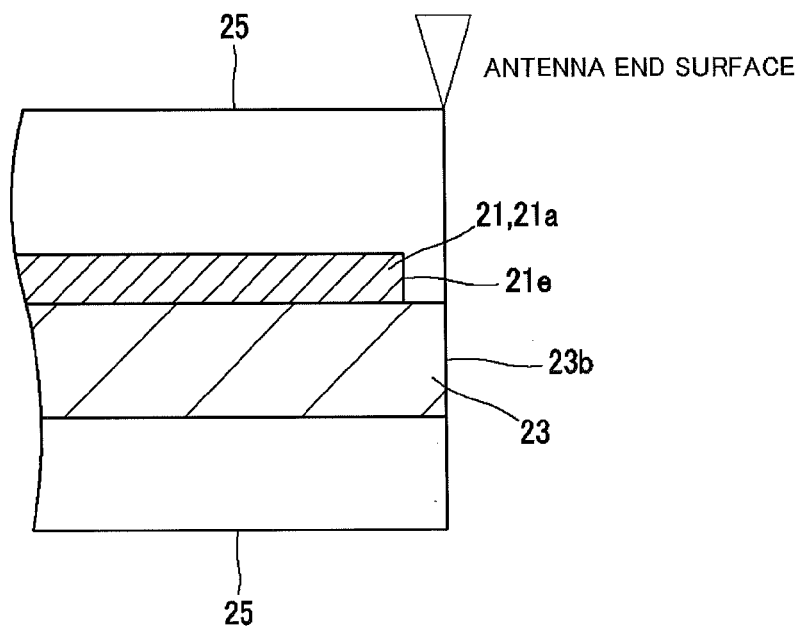

Next, with respect to the strength characteristic against an external physical force relating to the antenna modules 1a and 1b to which the present invention is applied, and the environmental characteristic relating to a manufacturing process to be described later, antenna modules 2a and 2b relating to comparative examples 1 and 2 as shown in FIGS. 6A-6B will be compared with each other so as to be evaluated.

In this case, as shown in FIG. 6A, the antenna module 2a relating to comparative example 1 has a structure in which a film-shaped protective member 25 is stacked on each of the two surfaces of the laminated member of the magnetic sheet 23 and an antenna coil 21a that are disposed in such a position as to be superimposed on each other; however, the end portion 21e of the antenna substrate 21 on which the antenna coil 21a is formed and the end portion 23b of the magnetic sheet 23 are not covered with the protective member 25.

Moreover, the antenna module 2b, as shown in FIG. 6B, relating to comparative example 2 has a structure in which the film-shaped protective member 25 is stacked on each of the two surfaces of the laminated member of the magnetic sheet 23 and the antenna coil 21a that are disposed in such a position as to be superimposed on each other; however, the end portion 21e of the antenna substrate 21, on which the antenna coil 21a is formed, is covered with the protective member 25, while the end portion 23b of the magnetic sheet 23 is not covered with the protective member 25. That is, in the antenna module 2b, the end portion 21e of the antenna substrate 21 is positioned on the center side of the antenna module 2b rather than on the end portion 23b of the magnetic sheet 23.

Moreover, as specific evaluation conditions, the following members were utilized.

That is, as a printed substrate on which an antenna coil was assembled, a flexible printed substrate made of a PI layer having a thickness of 25 μm and a Cu layer having a thickness of 35 μm was used.

Moreover, as a magnetic sheet, ferrite having a complex permeability μ' of 100 and a thickness of 200 μm was used. In this case, the magnetic sheet may have a thickness in a range from 150 μm to 400 μm, and in particular, the thickness in a range from 180 μm to 300 μm in total. That is, in order to achieve good characteristic, the thickness of ferrite of about 200 μm or more at the minimum may be beneficial.

As a ferrite material of 200 μm or more, a sheet type or bulk type material is available. In the case of the sheet type, because protective films are formed on the both surfaces, coming off of cracked portions due to a softening treatment or the like of ferrite can be prevented; however, when an outside shape processing is carried out by using a metal mold, a powder drop tends to occur on the end face portion. In the case of the bulk type, because a slicing process of a predetermined thickness, for example, 200 μm is carried out by a slicer or a wire process, no powder drop is caused; however, the powder drop is caused by an external force.

Moreover, the antenna module is configured by inserting this ferrite of the bulk type into the center portion of the antenna coil, and after the insertion, when ferrite is cracked, the inductance of the antenna is varied. Therefore, in order to preliminarily prevent this, after having been coated with the above mentioned film-shaped protective member, split portions are formed on the ferrite by using a roller or the like. In this case, a powder drop from the split ferrite can be prevented by the protective member. By using this process, the powder drop from the end face portion can be prevented even in the case of a ferrite outside shape product of the sheet type.

With respect to the protective member, a film of an insulating material having a thickness of 30 μm made of, for example, a polyester/acryl sticker, such as 633S or the like made by Teraoka Seisakusho Co., Ltd., or a polyester/acryl sticker of GL series made by Nichieikako Co., Ltd. was used. Additionally, the thickness of the protective member is selected, on demand, within a range of 5 μm to 50 μm, and as another material, a film made of a polyimide/acryl sticker, a PEN/acryl sticker, a polyimide/silicone-based material, or a fluorine resin film/silicone-based material may be used.

Under these conditions, the characteristic of examples 1 and 2 as well as comparative examples 1 and 2 were evaluated, and shown in the following Table 1.

TABLE 1

|  | Kinds of ferrite | Ferrite width | FPC width | Protective member width | Powder drop | Environmental characteristic |
|---|---|---|---|---|---|---|
| Example 1 | Bulk | 8.5 | 8.5 | 9 | ○ | ○ |
| Example 2 | Sheet | 7.5 | 8.5 | 8.5 | ○ | Δ |
| Example 2 | Bulk | 7.5 | 8.5 | 8.5 | ○ | ○ |
| Comparative Example 1 | Bulk | 8.5 | 8.5 | 8.5 | Δ | ○ |
| Comparative Example 2 | Bulk | 8.5 | 7.5 | 8.5 | Δ | ○ |
| Comparative Example 3 | Sheet | 8.5 | 8.5 | None | Δ | Δ |

Additionally, in the Table, "No Protective Member" refers to an antenna module relating to comparative example 3, not shown, that is, an antenna module in which no protective member is stacked on each of the two surfaces of the laminated member at a mutually superimposed position of a magnetic sheet and an antenna coil. Moreover, "Ferrite Width", "FPC Width" and "Protective Member Width" indicate the widths of a magnetic sheet, an antenna substrate and a protective member, which are defined in the y-axis direction. In this case, the width of the protective member corresponds to the width of the antenna module.

As clearly indicated by the results of Table 1, in the antenna modules 1a and 1b, because all the magnetic sheets 13 that are not superimposed on the antenna coils 11a are covered with the protective members, no "powder drop" is caused, so that scattering of the magnetic member may be prevented.

Moreover, as the kinds of the ferrite, when bulk and sheet members are evaluated from the viewpoint of environmental loads, the sheet type requires a mixing process for preparing green sheets prior to a firing process, and in this process, a solvent having a weight ratio of about 20 to 60% relative to the ferrite material is used. On the other hand, in the case of the bulk type, a ferrite material is put into a mold, and subjected to a molding process, and then formed into ferrite in a firing process; therefore, as no solvent is used, this method may be advantageous from the viewpoint of environmental loads.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

REFERENCE SIGNS LIST

1 . . . communication apparatus, 1a, 1b, 2a, 2b . . . antenna module, 11, 21 . . . antenna substrate, 11a, 21a . . . antenna coil, 11b . . . terminal unit, 11c . . . center portion, 11d, 11e, 13a, 13b, 21e, 23b, 133b . . . end portion, 12 . . . communication processing unit, 13, 23 . . . magnetic sheet, 15, 25 . . . protective member, 100 . . . radio communication system, 120 . . . reader writer, 121 . . . antenna, 122 . . . control substrate, 130 . . . portable telephone, 131 . . . casing, 131a . . . inner circumferential wall, 132 . . . gap, 133 . . . battery pack, 133a . . . metal plate

The invention claimed is:

1. A communication apparatus assembled into an electronic apparatus and made communicatable upon receipt of a magnetic field transmitted from a transmitter, the communication apparatus comprising:
 a laminated member made by mutually superimposing an antenna coil inductively coupled to the transmitter and formed on an antenna substrate with a magnetic sheet for drawing a magnetic field transmitted from the transmitter to the antenna coil;
 a film-shaped protective member that covers the laminated member at least up to an end portion of the magnetic sheet; and
 a communication processing unit that carries out communication to and from the transmitter and is driven by an electric current flowing through the antenna coil,
 wherein, when the laminated member is inserted into a center portion of the antenna coil, the antenna coil and the magnetic sheet are mutually superimposed in a manner such that:
  the magnetic sheet is positioned closer to a transmitter side than the antenna coil on an upstream side in a proceeding direction of the magnetic field oriented by a casing surface opposed to the transmitter, and
  the antenna coil is positioned closer to the transmitter side than the magnetic sheet on a downstream side in the oriented proceeding direction, and
 wherein the antenna coil is wound in such a manner that an opening of the antenna coil is positioned in a gap between an end portion of a conductor made face to face with the transmitter inside a casing of the electronic apparatus and an inner circumferential wall of the casing.

2. The communication apparatus according to claim 1, wherein the magnetic sheet is formed such that, in a direction in which the magnetic sheet is inserted to the center portion of the antenna coil, two ends of the magnetic sheet are located at positions closer to the center portion relative to two ends of the antenna substrate.

* * * * *